(12) United States Patent
Mathews et al.

(10) Patent No.: US 9,240,053 B2
(45) Date of Patent: Jan. 19, 2016

(54) TARGET TRACKING

(75) Inventors: George Morgan Mathews, Bristol (GB); David Nicholson, Bristol (GB)

(73) Assignee: BAE Systems plc, London (GB)

( * ) Notice: Subject to any disclaimer, the term of this patent is extended or adjusted under 35 U.S.C. 154(b) by 578 days.

(21) Appl. No.: 13/635,193

(22) PCT Filed: Mar. 8, 2011

(86) PCT No.: PCT/GB2011/050452
§ 371 (c)(1),
(2), (4) Date: Sep. 14, 2012

(87) PCT Pub. No.: WO2011/114133
PCT Pub. Date: Sep. 22, 2011

(65) Prior Publication Data
US 2013/0006577 A1    Jan. 3, 2013

(30) Foreign Application Priority Data
Mar. 15, 2010   (GB) .................................. 1004228.1

(51) Int. Cl.
*G06T 7/20* (2006.01)
*G01S 13/72* (2006.01)

(52) U.S. Cl.
CPC ............... *G06T 7/208* (2013.01); *G01S 13/726* (2013.01)

(58) Field of Classification Search
CPC ....... G01S 13/723; G01S 13/726; G06K 9/32; G06K 9/00261; G06T 2207/10016; G06T 7/208
USPC .................... 342/95, 195; 348/169; 382/103; 702/196, 181, 189, 116
See application file for complete search history.

(56) References Cited

U.S. PATENT DOCUMENTS 4,847,817 A  *  7/1989  Au et al. ....................... 367/135
5,202,691 A      4/1993  Hicks
(Continued)

FOREIGN PATENT DOCUMENTS

CN       101430757 A     5/2009
EP       1 980 994 A1    10/2008
(Continued)

OTHER PUBLICATIONS

International Search Report (PCT/ISA/210) issued on Aug. 30, 2011, by the British Patent Office as the International Searching Authority for International Application No. PCT/GB2011/050452.
(Continued)

*Primary Examiner* — Toan Le
*Assistant Examiner* — Jeffrey Aiello
(74) *Attorney, Agent, or Firm* — Finch & Maloney PLLC

(57) ABSTRACT

An apparatus and a method are disclosed for tracking a plurality of targets (e.g. land-based vehicles). The method can include: for a first time-step, estimating a state of each respective target; at a second time-step, measuring values for a state of each target; for the second time-step, estimating a state of each target using the estimated target states for the first time-step; updating the estimated target states for the second time-step by performing a Joint Probabilistic Data Association process using the measured values; and performing an identity management process to estimate a probability that a particular state measurement corresponds to a particular.

20 Claims, 3 Drawing Sheets

(56) References Cited

U.S. PATENT DOCUMENTS

| | | | |
|---|---|---|---|
| 5,353,228 A * | 10/1994 | Geiss et al. | 356/5.01 |
| 6,243,037 B1 * | 6/2001 | Pulford et al. | 342/95 |
| 6,278,401 B1 * | 8/2001 | Wigren | 342/195 |
| 7,248,206 B1 | 7/2007 | Boka et al. | |
| 7,917,332 B2 * | 3/2011 | Waldock et al. | 702/181 |
| 8,089,393 B2 * | 1/2012 | Nettleton et al. | 342/59 |
| 8,130,137 B1 * | 3/2012 | Luu et al. | 342/62 |
| 8,886,394 B2 * | 11/2014 | Noonan | 701/30.3 |
| 2003/0103647 A1 | 6/2003 | Rui et al. | |
| 2003/0204382 A1 * | 10/2003 | Julier et al. | 702/196 |
| 2004/0220769 A1 | 11/2004 | Rui et al. | |
| 2008/0128546 A1 | 6/2008 | Olsson et al. | |
| 2008/0243425 A1 | 10/2008 | Eliazar | |
| 2008/0259163 A1 * | 10/2008 | Yu et al. | 348/169 |
| 2009/0175500 A1 | 7/2009 | Kizuki et al. | |
| 2009/0278736 A1 * | 11/2009 | Cohen et al. | 342/357.08 |
| 2009/0299494 A1 * | 12/2009 | Kahn | 700/28 |
| 2010/0054536 A1 | 3/2010 | Huang et al. | |
| 2011/0129119 A1 * | 6/2011 | Eggert et al. | 382/103 |
| 2011/0169951 A1 * | 7/2011 | Claxton et al. | 348/143 |
| 2012/0316819 A1 * | 12/2012 | Martell et al. | 702/94 |
| 2013/0006574 A1 | 1/2013 | Nicholson et al. | |
| 2013/0006576 A1 | 1/2013 | Mathews et al. | |
| 2013/0006577 A1 * | 1/2013 | Mathews et al. | 702/150 |

FOREIGN PATENT DOCUMENTS

| | | |
|---|---|---|
| JP | 2000-162313 A | 6/2000 |
| JP | 2006-153736 A | 6/2006 |
| JP | 2008-140101 A | 6/2008 |
| JP | 2009-182624 A | 8/2009 |
| JP | 2009-188977 A | 8/2009 |
| WO | WO 2008/098915 A1 | 8/2008 |

OTHER PUBLICATIONS

Written Opinion (PCT/ISA/237) issued on Aug. 30, 2011, by the British Patent Office as the International Searching Authority for International Application No. PCT/GB2011/050452.

Search Report issued on Jul. 7, 2010, by the British Patent Office for Application No. 1004228.1.

International Search Report (PCT/ISA/210) issued on Aug. 5, 2011, by the British Patent Office as the International Searching Authority for International Application No. PCT/GB2011/050435.

Written Opinion (PCT/ISA/237) issued on Aug. 5, 2011, by the British Patent Office as the International Searching Authority for International Application No. PCT/GB2011/050435.

Search Report issued on Jul. 5, 2010, by the British Patent Office for Application No. 1004234.9.

International Search Report (PCT/ISA/210) issued on Aug. 8, 2011, by the British Patent Office as the International Searching Authority for International Application No. PCT/GB2011/050463.

Written Opinion (PCT/ISA/237) issued on Aug. 8, 2011, by the British Patent Office as the International Searching Authority for International Application No. PCT/GB2011/050463.

Search Report issued on Jul. 9, 2010, by the British Patent Office for Application No. 1004232.3.

Herman, "A Particle Filtering Approach to Joint Passive Radar Tracking and Target Classification", Jan. 2002.

Ekman, "Particle filters and data association for multi-target tracking", Information Fusion, $11^{th}$ International Conference on IEEE, Jun. 2008, pp. 1-8.

INSPEC Accession No. 9084487. J Almeida et al., $10^{th}$ IEEE Int. Conf. on Emerging Technologies and Factory Automation, Catania, Sep. 2005 (Abstract only).

Ekman, "Particle Filtering and Data Association using Attribute Data", Information Fusion, IEEE $12^{th}$ International Conference, Jul. 2009, pp. 9-16.

Liu et al., "Distributed State Representation for Tracking Problems in Sensor Networks", ACM, Apr. 2004, pp. 234-242.

Hwang et al., "Multiple-Target Tracking and Identity Management in Clutter, with Application to Aircraft Tracking", Proceeding of the 2004 American Control Conference, Jun.-Jul. 2004, pp. 3422-3428.

Liu et al., "Multitarget Tracking in Distributed Sensor Networks", IEEE Signal Processing Magazine, May 2007, pp. 36-46, vol. 24, No. 3.

Ali et al., "Multiple Human Tracking in High-Density Crowds", Advanced Concepts for Intelligent Vision Systems, Sep. 2009, pp. 540-549.

Schumitsch et al., "The Identity Management Kalman Filter (IMKF)", Proc Robotics Science & Systems, 2006 (month unknown).

Guibas, "The Identity Management Problem—A Short Survey", Proc Int Conf Information Fusion, 2008 (month unknown), pp. 78-84.

Schumitsch et al., "The Information-Form Data Association Filter", 2006 (month unknown), pp. 1193-1200.

Wikipedia—Kalman Filter, http://en.wikipedia.org/wiki/Kalman_filter, retrieved Aug. 7, 2010.

* cited by examiner

TARGET TRACKING

FIELD OF THE INVENTION

The present invention relates to methods and apparatus for tracking a plurality of targets.

BACKGROUND

Target tracking typically comprises inferring an unobserved state vector of a target (for example a vector including a target's position and velocity) from a given set of sensor observations and prior assumptions about target behaviour and sensor properties.

Conventional multi-target tracking algorithms tend to encounter problems when implemented in certain situations. In particular, problems tend to be encountered in situations in which the motion of targets is constrained and the paths of targets overlap or are proximate to one another (e.g. road vehicle targets may be constrained to travel on roads, and a portion of a track followed by a target may be shared by multiple targets).

SUMMARY OF THE INVENTION

In a first aspect, the present invention provides a method of tracking a plurality of targets, the method comprising, for a first time-step, estimating a state of each respective target, at a second time-step, measuring values for a state of a target, for the second time-step, estimating a state of each respective target using the estimated target states for the first time-step, and updating the estimated target states for the second time-step by performing a Joint Probabilistic Data Association process using the measured values, and performing an identity management process to estimate the probability that a particular state measurement corresponds to a particular target, wherein the Joint Probabilistic Data Association process is implemented using a particle filter.

The method may further comprise, at a second time-step, measuring a value of an identity parameter for a target that values of a state are to be measured for; wherein the Joint Probabilistic Data Association process uses the measured identity parameter values.

The identity management process may comprise determining a mixing matrix, and determining the mixing matrix comprises determining values for elements $\hat{m}_{qr}$, where:

$$\hat{m}_{qr} = \int \sqrt{p_q(x)p_r(x)} dx;$$

$$p_i(x) = p(x_i = x|Y) \text{ for } i = q, r;$$

$x_i$ is a state of an ith target at the second time-step; and
Y is a set of all state values and identity parameter values measured at time steps up to and including the second time-step; and forming the elements into matrix $\hat{M} = [\hat{m}_{qr}]$.

Determining the mixing matrix may further comprise normalising the matrix $\hat{M}$.

Motion of the targets may be constrained to some extent.

The targets may be land-based vehicles.

A path of one of the targets may be proximate to a path of at least one different target.

A path of one of the targets may overlap to some extent the path of at least one different target.

Estimating a state of each of the targets may be performed using a particle filter.

A state of a target may comprise a value for a position of the target and/or a value for a velocity of the target.

In a further aspect, the present invention provides apparatus for tracking a plurality of targets, the apparatus comprising one or more processors arranged to, for a first time-step, estimate a state of each of the respective targets, and one or more sensors arranged, at a second time-step, to measure values for a state of a target, wherein the one or more processors are arranged, for the second time-step, to estimate a state of each respective target using the estimated target states for the first time-step, implement a particle filter to update the estimated target states for the second time-step by performing a Joint Probabilistic Data Association process using the measured values.

The one or more sensors may be further adapted, at a second time-step, to measure a value of the identity parameter for the target that values of a state are to be measured for, and the Joint Probabilistic Data Association process uses the measured identity parameter values.

A state of a target may comprise a value for a position of the target and/or a value for a velocity of the target.

In a further aspect, the present invention provides a program or plurality of programs arranged such that when executed by a computer system or one or more processors it/they cause the computer system or the one or more processors to operate in accordance with the method of any of the above aspects.

In a further aspect, the present invention provides a machine readable storage medium storing a program or at least one of the plurality of programs according to the above aspect.

DETAILED DESCRIPTION

Figure 1:
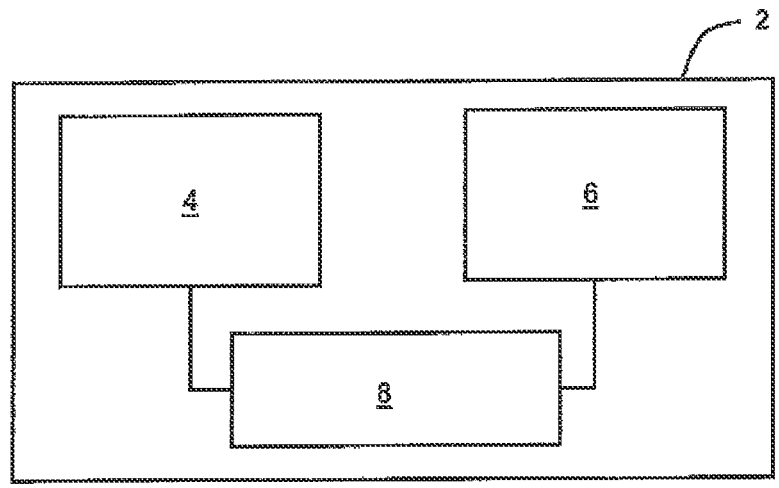
FIG. 1 is a schematic illustration of an example of a multi-target tracking device.

FIG. 1 is a schematic illustration (not to scale) of an example multi-target tracking device, hereinafter referred to as the "target tracker 2", that may be used to implement an embodiment of a process for tracking multiple targets and managing the identities of these targets. This process is hereinafter referred to as the "tracking and identification process".

In this example, the target tracker 2 comprises two sensors, namely a sensor capable of measuring the position and velocity of a target (hereinafter referred to as the "position sensor 4"), and a sensor capable of sensing the identity of a target (hereinafter referred to as the "identity sensor 6").

In other examples, the target tracker 2 comprises a different number of sensors or modules such that the same functionality is provided. For example, a single sensor may be used to produces position/velocity based and identity based information for a target. Also, in other examples identity information may be provided by processing position/velocity based information, e.g. the detection measurements may be processed by an automatic target recognition algorithm to generate target identity information (e.g. from target shape, colour, acoustic signature, etc).

The target tracker 2 further comprises a processor 8 coupled to the position sensor 4 and the identity sensor 6.

In this example, the position sensor 4 produces bearing and/or range information from the target tracker 2 to a target. The position sensor may, for example, be one or more acoustic arrays and/or electro-optical (EO) devices. In other examples, this sensor may measure other parameters related to a state of target, for example acceleration. In this embodiment, the state of a target comprises values for position and velocity parameters, i.e. variable parameters (parameters that have variable values for a given target).

The identity sensor 6 measures an acoustic signature of a target. These measurements enable the targets to be partially distinguished. However, the measurements may be prone to errors. In this embodiment, the identity sensor measures a parameter (in this case acoustic signature), the values of which (ignoring errors or measurement variations) remain substantially constant for a given target (e.g. a target's colour, or shape, or acoustic signature, and so on). Such a parameter, a set of measured values of which remain substantially constant for a given target, is hereinafter referred to as an "identity parameter". The substantially constant identity parameter values tend to allows targets to be partially distinguished. In other embodiments, the identity sensor 6 measures values of a different appropriate identity parameter for the targets.

The processor 8 implements a conventional particle filter (not shown) that utilises the measurements taken by the sensors to track a target. This is done using a Joint Probabilistic Data Association (JPDA) process as described in more detail later below with reference to FIGS. 3 and 4. Thus, the particle filter of the processor 8 is, in effect, a Joint Probabilistic Data Association Filter (JPDAF), see for example "*Monte Carlo filtering for multi-target tracking and data association*", J. Vermaak, S. J. Godsill, and P. Prez, IEEE Transactions on Aerospace and Electronic Systems, 41:309-332, 2005, which is incorporated herein by reference.

Figure 2:
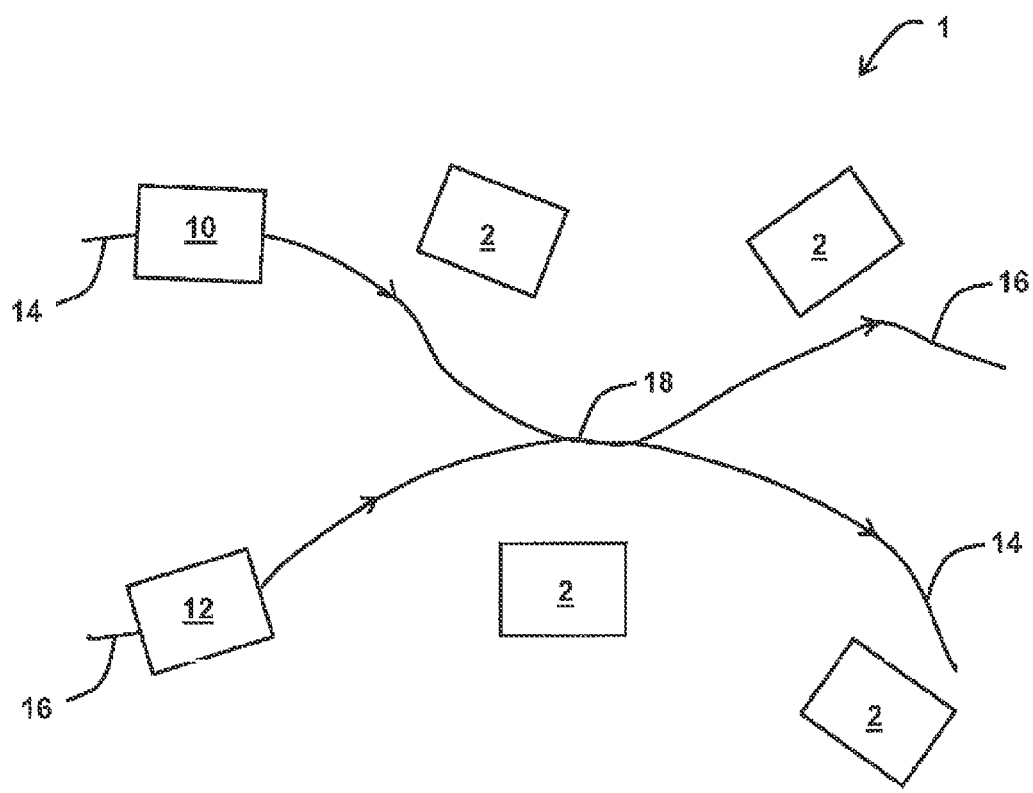
FIG. 2 is a schematic illustration of an example multi-target tracking scenario.

FIG. 2 is a schematic illustration (not to scale) of an example multi-target tracking scenario 1 in which the target tracker 2 may be implemented.

In this example, a plurality of target trackers 2 are used to track a first target 10 and a second target 12 as the targets 10, 12 move. In this example there are four target trackers 2 at different locations.

In the scenario 1, the first target 10 travels along a first track 14. Also, the second target 12 travels along a second track 16.

In the scenario 1, the first track 14 and the second track 16 overlap to some extent. The section of the tracks 14, 16 that overlaps is hereinafter referred to as the "overlap", and is indicated in FIG. 1 by the reference numeral 18.

The following information is useful in understanding the description of a target tracking process used by a target tracker 2 to track a target 10, 12. This process is described later below. The target tracking process may be used to track the targets 10, 12 and/or infer unobserved states (such as current and future positions and/or velocities) of the targets 10, 12.

Each target 10, 12 may be described by a state variable $x_j$ that includes the two-dimensional position and velocity of a target. The state vector is as follows:

$$x_j = [r_{j,x}, r_{j,y}, v_{j,x}, v_{j,y}]^T$$

where: j=1 for the first target 10;
j=2 for the second target 12;
$r_{j,x}$ is the position in the x-direction of the jth target;
$r_{j,y}$ is the position in the y-direction of the jth target;
$v_{j,x}$ is the velocity in the x-direction of the jth target; and
$v_{j,y}$ is the velocity in the x-direction of the jth target.
A set of all single target states is X, such that $x_j \in X$.

A probabilistic dynamical or motion model of the targets 10, 12 specifies how likely they are to transition from one state $x_j^k$ at a time $t_k$ to another state $x_j^{k+1}$ at a later time $t_{k+1} = t_k \Delta t$. This is completely specified by the following conditional probability density:

$$p(x_j^{k+1} | x_j^k)$$

A positional measurement of a target 10, 12 that is generated by a position sensor 4 of the ith target tracker 2 is denoted by $z_i$ in this description. An identity measurement of a target 10, 12 that generated by an identity sensor 6 of the ith target tracker 2, is denoted by $\zeta_i$ in this description.

For clarity and ease of understanding, it is assumed in this description that a position sensor 4 may produce false negatives but not false positives, i.e. clutter measurements are not considered. Thus, for the position sensor 14 of the ith target tracker 2, a probabilistic detection model that reflects the probability over a binary detection variable $D_i^k \in \{0,1\}$ for a given target state $x_j$ is:

$$p(D_i^k | x_j)$$

Observations are made independently for each of the targets.

This formulation allows information about the targets' states to be updated from both detection and non-detection events. Non-detection events imply that a target 10, 12 is not likely to be in a state where it can be easily detected.

For a non-detection event (i.e. $D_i^k = 0$) the observation variable is empty, i.e. $z_i = \emptyset$. For a detection event (i.e. $D_i^k = 1$) the observation variable is a member of the set Z, which denotes a set of all possible bearings and/or ranges measurements.

The measurement received in a detection observation is modelled by the following conditional distribution:

$$p(z_i^k = z | x_j, D_i^k = 1)$$

where $z \in Z$.

Thus, a full probabilistic position sensor model that represents the distribution over the measurements $z_i^k \in \emptyset \cap Z$ is:

$$p(z_i^k | x_j)$$

This sensor model can be expanded using the modelled detection probability:

$$p(z_i^k = \emptyset | x_j) = p(D_i^k = 0 | x_j)$$

$$p(z_i^k = z | x_j) = p(D_i^k = 1 | x_j) p(z_i^k = z | x_j, D_i^k = 1)$$

This formulation advantageously allows detection and non-detection events to be treated in a unified manner.

A detection event may generate identity information regarding the identity of a target 10, 12, i.e. an identity sensor 6 may detect a target 10, 12. An identity observation by the identity sensor 6 of the ith target tracker is represented by the variable $\zeta_i \in \{\emptyset, 1, 2\}$. Here $\zeta_i = 1$ if the first target 10 is detected, $\zeta_i = 2$ if the second target 12 is detected, and $\zeta_i = \emptyset$ if the identity sensor 6 does not have the ability to discriminate targets, or an automatic target recognition algorithm processing the measurements could not produce an accurate identification.

For simplicity and ease of understanding, in this description if a detection ($D^k = 1$) is generated, the identity observation is independent of the state of the target. Thus, a model of identity observations generated by the identity sensor 6 of the ith target tracker 2 is given by a distribution over given the underlying identity of the target j that is detected, i.e.:

$$p(\zeta_i | x_j) = p(\zeta_i | j)$$

where $$p(\zeta_i = \phi | j) = 1 - \beta_i$$

$$p(\zeta_i = j | j) = \alpha_i \beta_i$$

$$p(\zeta_i \neq j | j) = \frac{(1-\alpha_i)}{M-1}\beta_i$$

where:
- $\beta_i \in [0,1]$ represents how probable it is that a signature observation is generated by detection event;
- $\alpha_i \in [0,1]$ represents how confident the signature observations are; and
- M is the number of targets (i.e. two in the scenario 1).

It is possible to get positional information and no signature information, but it is not possible to signature information without positional information.

A joint state of the targets 10, 12 is defined as:

$$X = [x_1^T, x_2^T]^T$$

In this embodiment, the positional and signature observation variables are expressed together as:

$$y = [z, \zeta]$$

However, in other embodiments, only the positional information (i.e. not the identity information) is considered. Thus, in these embodiments y=z.

At a kth time step that the ith target tracker 2 takes a measurement, the sensors 4, 6 of the ith target tracker 2 generate a set of observations:

$$y_i^k = [y_{i,1}^k, y_{i,2}^k, \ldots, y_{i,L_i}^k]$$

where: $L_i^k$ is the number of detections generated by the sensors 4, 6 of the ith target tracker at time k; and $$y_{i,l}^k = [z_{i,l}^k, \zeta_{i,l}^k]$$

In the scenario 1, the tracking of the targets 10, 12 requires estimating the following probability distribution:

$$p(X^k | Y^{1:k})$$

where:
- $T^{1:k} = [Y^1, \ldots, Y^k]$;
- $Y^k = [y_1^k, \ldots, y_N^k]$; and
- N is the number of observations at time k.

To perform this estimation, the present invention utilises a joint probabilistic data association filter (JPDAF).

Figure 3:
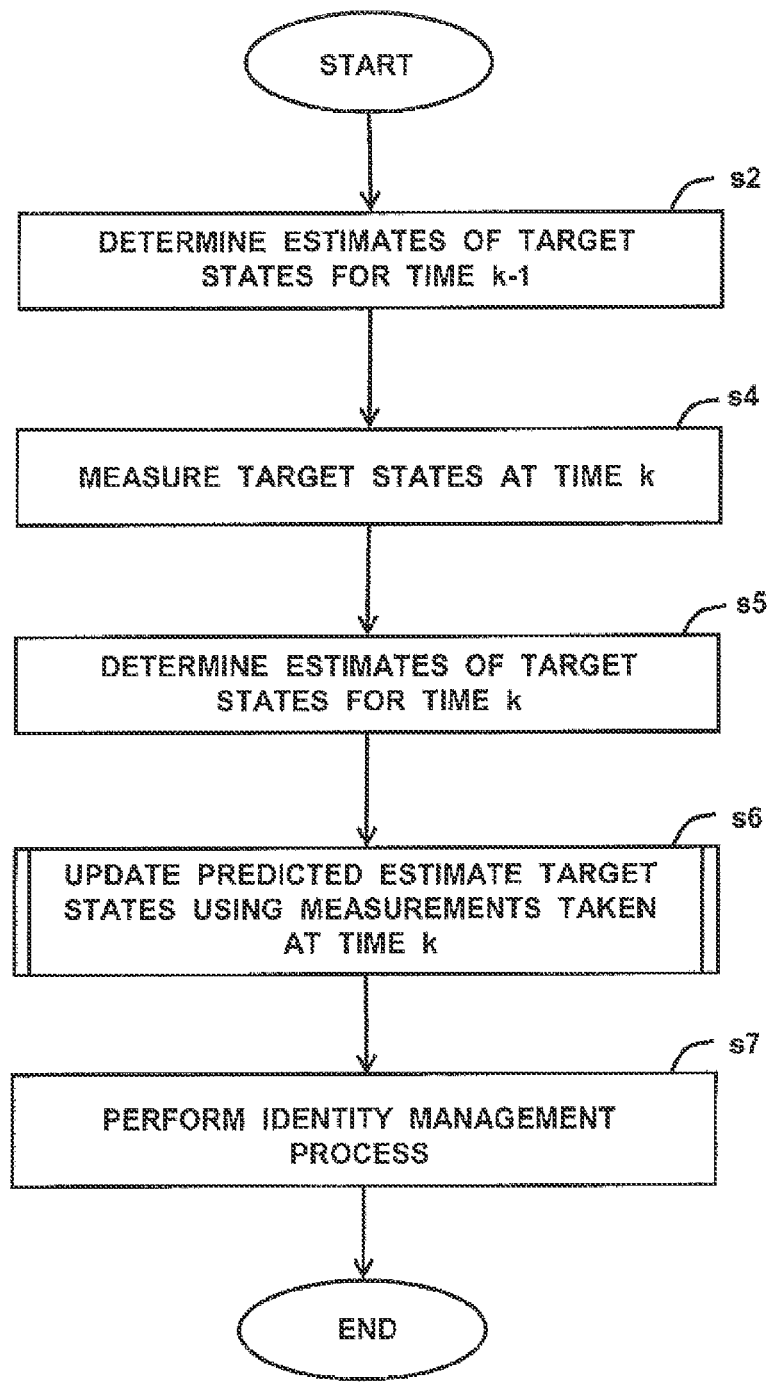
FIG. 3 is a process flowchart showing certain steps of an embodiment of a tracking and identification process.

FIG. 3 is a process flowchart showing certain steps of an embodiment of the tracking and identification process to estimate target states at a kth time-step. The process comprises a JPDA process carried out by the particle filters (i.e. the JPDAFs) of the processors 8 of the target trackers 2 and an identity management process.

In this embodiment, the tracking and identification process maintains a set of marginal estimates representing the state of each target 10, 12.

The process shown in FIG. 3 is for estimating target states at a kth time-step. In practice, this process may be performed for each of a series of time-steps to estimate target states at each of these time-steps using observations/measurement as they are acquired.

At step s2, estimates of the states of the targets at time k−1 are determined. In the recursive implementation of the process of FIG. 3, these estimates are the output of the previous iteration.

At time k−1 the state of each target $j \in \{1, 2\}$ is estimated separately by the following distribution:

$$p(x_j^{k-1} | Y^{1:k-1})$$

In this embodiment, the tracking and identification process is implemented using particle filters. The above defined prior estimate of the state of each target $j \in \{1, 2\}$ is given by a set of S weighted samples, such that:

$$p(x_j^{k-1} | Y^{1:k-1}) \approx \sum_{s=1}^{S} w_{j,(s)}^{k-1} \delta(x_j^{k-1} - x_{j,(s)}^{k-1})$$

where $x_{j,(s)}^{k-1}$ is the sth sample point (which is assigned a weight $w_{j,(s)}^{k-1}$). In this embodiment, the weights are normalised.

At step s4, observations of the targets 10, 12 are taken by the target trackers at time k (or put another way, the target states are measured at time k).

At step s5, the estimates of the states of the targets at time k are predicted (or put another way, estimates of the target states for time k are determined). In this embodiment, the estimates of the states of the targets at time k are predicted using the estimates of the states of the targets at time k−1. These predicted states are given by the following:

$$p(x_j^k | Y^{1:k-1}) = \int p(x_j^k | x_j^{k-1}) p(x_j^{k-1} | Y^{1:k-1}) dx_j^{k-1}$$

In this embodiment, a set of weighted particles, that represents the predicted estimate (i.e. the left hand side of above equation), are found using the sampling importance resampling method, also known as the bootstrap filter or condensation algorithm. In this method new sample points are generated using the prediction or motion model as the proposal distribution, i.e. for each sample point $x_{j,(s)}^{k-1}$ a new sample point is produced by sampling from the prediction or motion model:

$$x_{j,(s)}^k \sim p(x_j^k | x_{j,(s)}^{k-1})$$

These new sample points, and the original weights, approximate the predicted distribution of the jth target:

$$\{x_{j,(s)}^k, w_{j,(s)}^{k-1}\}_{s=1}^{S} \sim p(x_j^k | Y^{1:k-1})$$

At step s6, a process of updating the predicted target states is performed as described below with reference to FIG. 4. The description of step s7 will follow after the description of FIG. 4.

Figure 4:
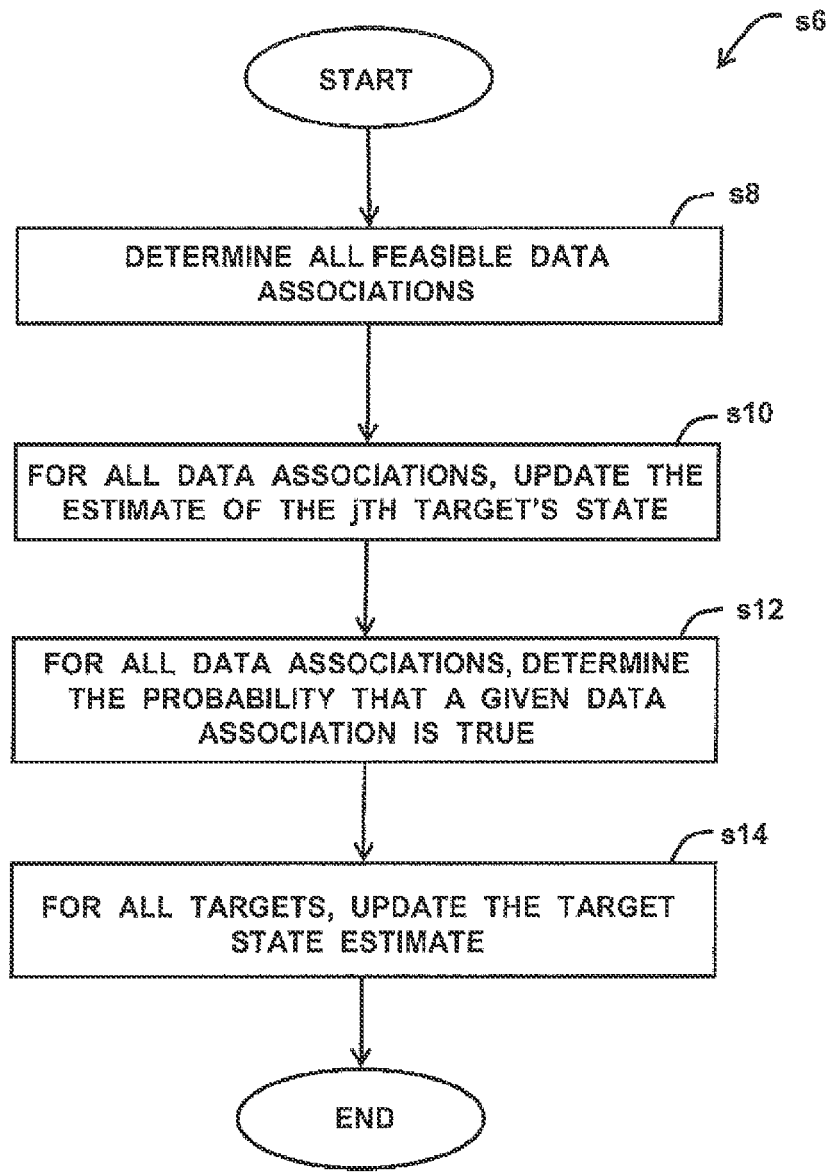
FIG. 4 is a process flowchart showing certain steps of step s6 of the process flowchart of FIG. 3.

FIG. 4 is a process flowchart showing certain steps of the process of step s6.

At step s8, all feasible data associations at time k are determined. The set of all feasible data associations are denoted by $A_k$. An element of this set $A_k \in A_k$ represents a mapping from observations to targets and is given by:

$$A_k = [a_{i,1}^k, a_{i,1}^k, \ldots, a_{i,L_i}^k]$$

where: $a_{i,1}^k \in \{1, 2\}$ specifies the target that generated the lth observation $y_{i,l}^k$.

For the distributed sensors (of the distributed target trackers 2 of FIG. 2) the set of feasible data associations is determined by analysing each sensor's field of view and their overlap with the predicted target estimates.

At step s10, for a given data association $A_k$, an estimate of the jth target's state is updated using Bayes' rule by calculating a posterior probability distribution:

$$p(x_j^k | Y^{1:k}, A^k) = \eta_1 p(x_j^k | Y^{1:k-1}) p(Y^k | x_j^k, A^k)$$

where $\eta_1$ is a normalisation constant.

In this embodiment, utilising a particle filter to estimate the states of the targets, this step updates the weights of each of the sample points. These new posterior weights are found for each of the feasible data associations $A_k$ and are computed using:

$$w_{j,(s)}^{k,A^k} = \eta_2 w_{j,(s)}^{k-1} p(Y^k | x_{j,(s)}^k, A^k)$$

where $\eta_2$ is a normalisation constant, such that the updated weights are normalised.

The superscript $A_k$ is used to explicitly show that these weights are produced by the given data association.

This process of updating the estimates using the observed information (step s6) can be done by just considering the state or positional information, z, however it is advantageous to explicitly include the identity information $\zeta$. This optional step can be accomplished by separating the joint observation likelihood into a product over the positional information and identity information captured by the sensors. In this embodiment the resulting included identity information is carried forward into steps s10, s12 and s14. This separation gives the following:

$$p(Y^k | x_j^k, A^k) = \prod_{\forall i: j \in A_i^k} p(z_{i,l_{ij}}^k | x_j^k) p(\zeta_{i,l_{ij}}^k | j) \times \prod_{\forall i: j \notin A_i^k} p(z_{i,l_{ij}}^k = \phi | x_j^k)$$

where $l_{ij}$ is the index of the observation made by the sensor of the ith target tracker 2 that is associated with the jth target, i.e. $l_{ij}$ is defined such that $a_{i,l_{ij}}^k = j$. It is noted that for an embodiment with y=z (that is the identity information is not used in the state estimation) the $p(\zeta_{i,l_{ij}}^k | j)$ can be removed.

The first term of the above equation finds the product of the individual detection events that are associated with the jth target, explicitly incorporating the information regarding the identity of the target, while the second term incorporates the effects of a non-uniform probability of detection over the target state space.

At step s12, the probability of a given data association $p(A^k | Y^{1:k})$ being true is approximated using the following:

$$p(A^k | Y^{1:k}) = \eta_3 p(Y^k | A^k, Y^{1:k-1})$$

where $\eta_3$ is a normalisation constant

This is equivalent to assuming the prior probability $p(A^k | Z^{1:k})$ is uniform. In this embodiment, the association likelihood is determined by:

$$p(Y^k | A^k, Y^{1:k-1}) = \int p(Y^k | X^k, A^k) p(X^k | Y^{1:k-1}) dX^k$$

$$= \prod_{j=1}^{M} p(Y^k | x_j^k, A^k) p(x_j^k | Y^{1:k-1}) dx_j^k$$

In this embodiment, the probability of a given data association is given by:

$$p(A^k | Y^{1:k}) = \eta_4 \prod_{j=1}^{M} \left[ \sum_{s=1}^{S} w_{j,(s)}^{k,A^k} \right]$$

where $\eta_4$ is a normalisation constant.

At step s14, for each target j, the updated estimates of the target states are determined. In this embodiment, the separate distributions over the state of each target are recovered by marginalising the joint distribution. This produces the following:

$$p(x_j^k | Y^{1:k}) = \int p(X^k | Y^{1:k}) dx_1^k dx_2^k \ldots dx_M^k$$

$$= \sum_{A^k \in \mathcal{A}^k} p(A^k | Y^{1:k}) p(x_j^k | Y^{1:k}, A^k)$$

This marginalisation operation is the source of the approximation within the JDPAF process that removes correlation information between the states of the targets.

In this embodiment, this marginalisation process is performed to determine posterior weight values. This is done by summing over the different association hypotheses:

$$w_{j,(s)}^k = \sum_{A^k \in \mathcal{A}^k} p(A^k | Y^{1:k}) w_{j,(s)}^{k,A^k}$$

After the posterior weights have been determined, an optional additional process of resampling the sample points may be performed so that unlikely points are discarded and likely points are replicated.

This completes the description of FIG. 4 (i.e. the description of step s6). Referring back to FIG. 3, the step following step s6, i.e. step s7, will now be described.

At step s7 a process of identity management is performed as follows.

This identity management process advantageously alleviates problems of mixing up the correspondence between tracks 14, 16 and targets 10, 12, e.g. when the paths of targets cross (for example at the overlap 18), or simply become close to one another. This tends to be an important problem to address when tracking a single target, or reconstructing paths of targets.

In this embodiment, for ease of understanding, the process model of the targets 10, 12 is uninformative compared to the accuracy of the sensors. Thus, it tends to be particularly computationally efficient to maintain a flattened probabilistic estimate of where the position of the targets 10, 12 and estimate the identities of the targets separately.

In other words, in this embodiment, the states of the targets 10, 12 are estimated using two particle filters, with the problem of data association solved using the JPDA algorithm (with or without the reformulation which explicitly incorporates the available identity information to improve data association hypothesis probabilities) and the mapping between estimated tracks and actual targets is additionally estimated. This additional estimation process will be referred to as the identity management process.

In this embodiment, the identity management process, i.e. the process of maintaining a distribution over target-to-track assignments, is as described in *"The identity management Kalman filter"*, B. Schumitsch, S. Thrun, L. Guibas, and K. Olukotun, Proc. of Robotics: Science and Systems, 2006, and *"The information-form data association filter"*, B. Schumitsch, S. Thrun, G. Bradski, and K. Olukotun, pages 1193-1200, 2006, which are incorporated by reference herein. However, in other embodiments a different identity management technique may be used, for example a technique which maintains a double stochastic belief matrix that represents the marginal probabilities of the individual track-to-target assignments or others as described in "*The identity management problem, a short survey*", L. J. Guibas In Proc. Int. Conf. on Information Fusion, 2008.

In this embodiment, the identity management process explicitly parameterises the joint distribution of the targets over the factorially many assignments.

In this embodiment, an extra filter is used to maintain identity information. This filter is represented as a matrix $\Omega$, hereinafter referred to as the "identity matrix". Each element in this matrix represents the amount of accumulated evidence that a given filtered track represents a particular target and is stored as the log probability that a given track is assigned to a given target. By representing the track-to-target association by a permutation matrix P, the information matrix defines a probability distribution over P:

$$p(P)=\exp(\text{trace}(\Omega P^T))$$

The most likely association between tracks and targets is determined by solving the following:

$$P^* = \underset{P}{\text{argmax}}\, p(P)$$
$$= \underset{P}{\text{argmax}}\, \text{trace}(\Omega P^T)$$

The identity matrix maintains the correlation between the joint state of the tracks 8, 10. This is achieved by enforcing each track estimate can only represent a single target 10, 12.

In this embodiment, to maintain the identity estimates of the tracks 8, 10, the identity matrix $\Omega$ is updated when a mixing event occurs that may lead to a track swap, and when new identity information about the identity of a target 10, 12 is observed by an identity sensor 16 of a target tracker 2. The terminology "mixing event" is used herein to refer to an event, a result of which is that it is possible that the correspondence between tracks and targets may be mixed up.

A mixing event may, for example, be caused by the two targets 10, 12 coming within proximity of one another (e.g. at the overlap 18) such that they cannot be accurately identified.

In this embodiment, a mixing event is defined by a doubly stochastic matrix $M_k$, herein after referred to as "the mixing matrix", that transforms the identity matrix $\Omega$ as follows:

$$\Omega^k=\log(M^k\exp(\Omega^{k-1}))$$

where $\log(\cdot)$ and $\exp(\cdot)$ are element wise operators.

The ijth element of the mixing matrix defines how much of the marginal of the identity of the ith target contributes to the subsequent marginal of the jth target.

In this embodiment the mixing matrix is determined by examining the overlap in the underlying state space of the track estimates, such that the elements of the mixing matrix are derived from/based on the overlap in the underlying state space of the track estimates. In other words, an element of the mixing matrix is based upon the overlap (in the underlying state space of target state estimates) of the target(s) corresponding to that element. This advantageously tends to alleviate identity mixing between targets/tracks that have little overlap in state space but a large overlap in observation space. For instance, using the position sensors 4, the targets 10, 12 may have similar positional estimates, but large differences in velocities tend not to lead to confusion in their identities. Thus, only tracks with similar state estimates are mixed.

In other embodiments mixing events may be identified by determining which tracks can be associated with a common observation and employing a data association uncertainty to determine the mixing matrix M, as in "*The identity management Kalman filter*", B. Schumitsch, S. Thrun, L. Guibas, and K. Olukotun, Proc. of Robotics: Science and Systems, 2006 or "*Multiple-target tracking and identity management*", I. Hwang, H. Balakrishnan, K. Roy, J. Shin, L. Guibas, and C. Tomlin, Proc. IEEE Sensors, 1:36-41, October 2003.

In this embodiment, the mixing matrix is constructed by considering all feasible pairwise swaps that can occur between the targets, as follows.

The mixing matrix M is constructed from the matrix $\hat{M}$ through appropriate normalisation using the Sinkhorn algorithm that iteratively normalises the row and column sums to create a doubly stochastic matrix.

The matrix $\hat{M}$ is defined as follows:

$$\hat{M}=[\hat{m}_{qr}]$$

where each element $\hat{m}_{qr}$ is the overlap between the qth and rth target estimates.

In this embodiment, this overlap is calculated using the Bhattacharyya coefficient:

$$\hat{m}_{qr}=\int\sqrt{p_q(x)p_r(x)}dx$$

where $p_t(x)=p(x_t^k=x|Y^{1:k})$ for t=q, r. In other embodiments, the overlap calculation may be implemented in any appropriate fashion, for example minor variations may be made to the above equation, or different equations may be used. These include the Hellinger distance defined as:

$$\tfrac{1}{2}\int(\sqrt{p_q(x)}-\sqrt{p_r(x)})^2 dx;$$

and the generalised Renyi divergence:

$$\frac{1}{\alpha-1}\log\int\frac{[p_q(x)]^\alpha}{[p_r(x)]^{\alpha-1}}dx.$$

In this embodiment, when estimates completely overlap, the element corresponding to the relevant targets equals one. Also, when there is no overlap, the relevant element equal zero.

The use of the above described mixing matrix advantageously tends to allow for an accurate description of how targets may mix (or the track labels may switch).

Thus, a process of multi-target tracking utilising a JPDA process implemented using particle filters and augmented with an identity management process is provided.

The present invention tends to be advantageously capable of allowing for the tracking and identification of individual targets in situations where the respective tracks of those targets overlap or are proximate to each other. For example, the present invention is particularly useful for tracking and identifying road vehicles moving along a road.

Moreover, the present invention advantageously utilises a particle filter to overcome a problems of the JPDA filter prediction and update equations tending to be difficult or impossible to solve analytically, without imposing certain restrictions (e.g. Gaussian uncertainty and linear prediction and motion models).

A further advantage of the present invention is that it tends to enable the identifying of targets whose tracks overlap or are proximate to one another resulting in uncertainty in the true identity of the target. This is advantageous whether identity information is available or not. Moreover, these identities may be managed affectivity.

Apparatus, including the one or more of the processors 18 of the target trackers 2, for implementing the above arrangement, and performing the method steps described above, may be provided by configuring or adapting any suitable apparatus, for example one or more computers or other processing apparatus or processors, and/or providing additional modules. The apparatus may comprise a computer, a network of computers, or one or more processors, for implementing instructions and using data, including instructions and data in the form of a computer program or plurality of computer programs stored in or on a machine readable storage medium such as computer memory, a computer disk, ROM, PROM etc., or any combination of these or other storage media.

Furthermore, the above embodiments may be implemented using one or more centralised processors that are provided with measurements/observations taken by sensors that are arranged to measure the targets at different points along their tracks. For example, the above embodiments may be implemented using a centralised processor module remote from position and identity sensors, the sensors being positioned at the locations of the target trackers 2 of FIG. 2.

It should be noted that certain of the process steps depicted in the flowcharts of FIGS. 3 and/or 4 and described above may be omitted or such process steps may be performed in differing order to that presented above and shown in the Figures. Furthermore, although all the process steps have, for convenience and ease of understanding, been depicted as discrete temporally-sequential steps, nevertheless some of the process steps may in fact be performed simultaneously or at least overlapping to some extent temporally.

In the above embodiments, the present invention is used to tracks two targets. However, in other embodiments, the present invention may be used track any number of targets.

In the above embodiments, four target trackers are used to track the targets. However, in other embodiments any number of target trackers may be used.

In the above embodiments, targets are described by a state variable that includes the two-dimensional position and velocity of a target. However, in other embodiments the state vector of a target may comprise any appropriate parameters that described a state of a target, for example, acceleration or three-dimensional position and/or velocity.

In the above embodiments, information of failed detection ("mis-detection information") is explicitly included in the observation likelihood. However, in other embodiments this mis-detection information is treated differently, for example it can be ignored and the information regarding failed detections not used by the tracker.

In the above embodiments, the target trackers each comprise position and identity sensors. However, in other embodiments one or more of the target trackers comprises any number of any appropriate type of sensors that are used to determine a state of a target and/or an identity of a target.

In the above embodiments, for ease of understanding, the different targets are observed independently of each other and there are no interference effects when multiple targets are observed at the same time. In other embodiments, such this is not case and problems arising from such effects are alleviated, for example by utilising a multi-target sensor model that determines the probability over observations given the states of multiple targets.

In the above embodiments, for ease of understanding, a single track is associated with a single target. However, in other embodiments the above described formulation of the JPDA process is extended to advantageously account for situations in which a single filtered track represents different targets at different times. For example, this may be accomplished by replacing the target index j with a track index t in all the filtering equations. However, in situations in which the identity of a target is not known (i.e. only estimated), the process tends to require extending. This is done by, for example, computing a set of marginal distributions over the track to target assignments. This results in a doubly stochastic belief matrix. This matrix belief matrix can be constructed from the information matrix using efficient Monte Carlo Markov chain sampling methods.

The invention claimed is:

1. A method of tracking a plurality of targets, the method comprising:
   for a first time-step, estimating a state of each target;
   at a second time-step:
      measuring values for a state of a target; and
      measuring and updating a value of an identity parameter for the target, wherein the identity parameter at least partially distinguishes the target from one or more of the other targets;
   for the second time-step, estimating a state of each target using the estimated target states for the first time-step;
   updating the estimated target states for the second time-step by performing a Joint Probabilistic Data Association process using the measured values for the states of the targets; and
   performing an identity management process to estimate a probability that a particular state measurement corresponds to a particular target, wherein the Joint Probabilistic Data Association process is implemented using a particle filter; and
   wherein the estimated probability is a function of the state of the particular target at the second time-step, and a set of all state values and identity parameter values measured at time steps up to and including the second time-step.

2. A method according to claim 1,
   wherein the Joint Probabilistic Data Association process uses the measured identity parameter values.

3. A method according to claim 1, wherein the identity management process comprises:
   determining a mixing matrix having values for elements $\hat{m}_{qr}$, where:

$$\hat{m}_{qr} = \int \sqrt{p_q(x) p_r(x)} dx;$$

$$p_i(x) = p(x_i = x | Y) \text{ for } i = q, r;$$

$x_i$ is a state of an ith target at the second time-step; and
   Y is a set of all state values and identity parameter values measured at time steps up to and including the second time-step; and
   forming the elements into matrix $\hat{M} = [\hat{m}_{qr}]$.

4. A method according to claim 3, wherein determining the mixing matrix comprises:
   normalizing the matrix $\hat{M}$.

5. A method according to claim 1, wherein motion of the targets to be tracked is constrained.

6. A method according to claim 5, wherein the targets are land-based vehicles.

7. A method according to claim 1, wherein a path of one of the targets is proximate to a path of at least one different target.

8. A method according to claim 7, wherein the path of one of the targets overlaps a path of at least one different target.

9. A method according to claim 1, wherein estimating a state of each of the targets is performed with a particle filter.

10. A method according to claim 1, wherein a state of a target comprises a value for a position of the target and/or a value for a velocity of the target.

11. Apparatus for tracking a plurality of targets, the apparatus comprising:

one or more processors arranged for a first time-step, to estimate a state of each target; and one or more sensors arranged, at a second time-step, to:
measure values for a state of a target; and
measure and update a value of an identity parameter for the target, wherein the identity parameter at least partially distinguishes the target from one or more of the other targets;

wherein the one or more processors are configured:
for the second time-step, to estimate a state of each target using the estimated target states for the first time-step;
to implement a particle filter to update estimated target states for the second time-step by performing a Joint Probabilistic Data Association process using the measured values for the states of the targets; and
to perform an identity management process to estimate a probability that a particular state measurement corresponds to a particular target;
wherein the estimated probability is a function of the state of the particular target at the second time-step, and a set of all state values and identity parameter values measured at time steps up to and including the second time-step.

12. Apparatus according to claim 11, wherein
the Joint Probabilistic Data Association process uses the measured identity parameter values.

13. Apparatus according to claim 11, wherein a state of a target comprises a value for a position of the target and/or a value for a velocity of the target.

14. A non-transitory computer program product encoded with instructions that, when executed by one or more processors, causes a process to be carried out, the process comprising:
for a first time-step, estimating a state of each target;
at a second time-step:
measuring values for a state of a target; and
measuring and updating a value of an identity parameter for the target, wherein the identity parameter at least partially distinguishes the target from one or more of the other targets;

for the second time-step, estimating a state of each target using the estimated target states for the first time-step;
updating the estimated target states for the second time-step by performing a Joint Probabilistic Data Association process using the measured values for the states of the targets; and
performing an identity management process to estimate a probability that a particular state measurement corresponds to a particular target, wherein the Joint Probabilistic Data Association process is implemented using a particle filter; and
wherein the estimated probability is a function of the state of the particular target at the second time-step, and a set of all state values and identity parameter values measured at time steps up to and including the second time-step.

15. The computer non-transitory program product according to claim 14, wherein the Joint Probabilistic Data Association process uses the measured identity parameter values.

16. The computer non-transitory program product according to claim 14, wherein motion of the targets to be tracked is constrained.

17. The computer non-transitory program product according to claim 14, wherein a path of one of the targets is proximate to a path of at least one different target.

18. The computer non-transitory program product according to claim 17, wherein the path of one of the targets overlaps a path of at least one different target.

19. The computer non-transitory program product according to claim 14, wherein estimating a state of each of the targets is performed with a particle filter.

20. The computer non-transitory program product according to claim 14, wherein a state of a target comprises a value for a position of the target and/or a value for a velocity of the target.

* * * * *